United States Patent [19]

Nametz et al.

[11] 4,242,473

[45] Dec. 30, 1980

[54] FLAME RETARDED POLY(BUTYLENE TEREPHTHALATE) COMPOSITION

[75] Inventors: Richard C. Nametz, Manchester; Robert J. Nulph, Ypsilanti, both of Mich.

[73] Assignee: Velsicol Chemical Corporation, Chicago, Ill.

[21] Appl. No.: 74,363

[22] Filed: Sep. 10, 1979

Related U.S. Application Data

[63] Continuation-in-part of Ser. No. 877,157, Feb. 13, 1978, abandoned.

[51] Int. Cl.³ .............................................. C08G 65/48
[52] U.S. Cl. .............................. 525/397; 260/45.75 B; 260/45.95 G; 525/437
[58] Field of Search .............................. 525/397, 437; 260/45.75 B, 45.95 G

[56] References Cited

U.S. PATENT DOCUMENTS

| | | | |
|---|---|---|---|
| 2,465,319 | 3/1949 | Whinfield et al. | 260/75 |
| 3,361,851 | 1/1965 | Gowan | 260/897 |
| 3,379,792 | 4/1968 | Finholt | 260/857 |
| 3,383,435 | 5/1968 | Cizek | 260/874 |
| 3,639,499 | 2/1972 | Snodgrass et al. | 260/829 |
| 3,639,506 | 2/1972 | Haaf | 260/874 |
| 3,660,531 | 5/1972 | Lauchlan et al. | 260/876 |
| 3,760,003 | 9/1973 | Asadorian et al. | 260/613 R |
| 4,033,927 | 7/1977 | Borman | 260/45.7 P |
| 4,141,880 | 2/1979 | Nametz et al. | 525/397 |

FOREIGN PATENT DOCUMENTS 999134 7/1965 United Kingdom .
1324057 7/1973 United Kingdom .

OTHER PUBLICATIONS

Vol. 82, Journal of the American Chemical Society, pp. 3632–3634 (1960).
Vol. 43, Journal of the American Chemical Society, pp. 131–159 (1921).
Bulletin of the Chemical Society of Japan, vol. 35, pp. 1958–1965 (1962).
Nippon Kagaku Kaishi No. 10, pp. 1608–1614 (1976).

*Primary Examiner*—Melvyn I. Marquis
*Attorney, Agent, or Firm*—Dietmar Olesch; Robert J. Schwarz

[57] ABSTRACT

A flame-retarded poly(butylene terephthalate) composition comprised of poly(butylene terephthalate) and from about 5 to about 35 percent (by weight of total composition) of a condensation product derived from brominated phenol is disclosed.

5 Claims, No Drawings

FLAME RETARDED POLY(BUTYLENE TEREPHTHALATE) COMPOSITION

This is a continuation-in-part of co-pending application Ser. No. 877,157 filed Feb. 13, 1978 now abandoned.

This invention relates to a flame-retarded poly(butylene terephthalate) composition comprised of poly(butylene terephthalate) and from about 5 to about 35 percent (by weight of total composition) of a condensation product derived from brominated phenol.

PRIOR ART

Poly(butylene terephthalate) polymers have been known to those skilled in the art for many years. They were generally disclosed in, e.g., U.S. Pat. No. 2,465,319; and they have been described in many publications since then.

These poly(butylene terephthalate) compositions can be made by methods well known to the art. Thus, e.g., they can be produced from the corresponding bis(hydroxyalkyl) terephthalic acid or a dialkyl ester of terephthalic acid with a glycol having 4 carbon atoms such as, e.g., tetramethylene glycol. A process for preparing this composition is disclosed, e.g., in British Pat. No. 1,324,057.

For many applications, the poly(butylene terephthalate) composition must be flame retarded. However, the flame retardant to be used must be compatible with the poly(butylene terephthalate), i.e., it must not migrate to the surface of the polymer. Such migration has several very adverse effects: it is aesthetically objectionable, it causes contamination of products in contact with the surface of the polymer, and it decreases the concentration of the flame retardant in the polymer.

Decabromobiphenyl oxide is widely used to flame retard such thermoplastic compositions as high impact polystyrene, poly(butylene terephthalate), nylon, and the like. However, it is substantially incompatible with poly(butylene terephthalate); after being intimately admixed with said polymer, a substantial amount of it deposits on the surface of the polymer during normal conditions of use and at elevated temperatures. Consequently, poly(butylene terephthalate) flame retarded with decabromobiphenyl oxide is unsuitable for use in many applications. Thus, for example, it is generally unsuitable for use in electrical and electronic applications where the migration of the halogen-containing flame retardant may cause corrosion. Thus, for example, it is disadvantageous to use it for injection molding plastic parts; for the decabromobiphenyl oxide, being volatile, "plates out", deposits itself on the mold, and causes surface imperfections in the finished molded parts.

Poly(phenylene oxide) compositions possess excellent flammability properties. These poly(phenylene oxides) are extensively described in the literature. See, e.g., Journal of the American Chemical Society, 1921 (43), pp. 131–159 (reactions of certain brominated phenol salts), Nippon Kagaku Kaishi, 1976 (10), pp. 1608–1614 (polymerization of sodium 2,4,6-tribromophenolate), Journal of the American Chemical Society, 1960 (82), pp. 3632–3634 (polymerization of the silver salt of 2,4,6-tribromophenol by iodine), Bulletin of the Chemical Society of Japan, 1962 (35) pp. 1958–1965 (reaction of benzoyl peroxide with various subsituted phenols), British Pat. No. 999,134 issued July 21, 1965 (preparation of various halogenated phenylene oxide polymers by heating metal 4-halogenophenoxides in a ketone solvent), U.S. Pat. No. 3,361,851 (blend of a polyolefin and a polyphenylene oxide), U.S. Pat. No. 3,379,792 (blend of poly(phenylene oxide) and from 0.1 to 25 percent of a polyamide), U.S. Pat. No. 3,383,435 (blend of a poly[phenylene ether] and a styrene resin), U.S. Pat. No. 3,639,499 (blend of a high melting hydrocarbon resin and polyphenylene ether), U.S. Pat. No. 3,639,506 (which discloses that ". . . the admixture of a polyphenylene ether with a styrene resin destroys the flame retardancy of the polyphenylene ethers"), U.S. Pat. No. 3,660,531 (blends of polyphenylene oxide with butadiene homopolymers and copolymers), etc. There are many other prior art references, both domestic and foreign, which describe polyphenylene oxide compositions.

Polyphenylene oxides are generally incompatible with other polymers; see, e.g., pp. 251–314 of "Journal of Macromolecular Science—Reviews of Macromolecular Chemistry", C7(2), 1972 wherein S. Krause indicates that these compositions are incompatible with homopolymers and copolymers such as polycarbonates, polysulfones, a copolymer of butadiene and acrylonitrile, a copolymer of epichlorohydrin and ethylene oxide, a copolymer of methyl vinyl ether and maleic anhydride, polyester-urethane, a copolymer of styrene and acrylonitrile, a copolymer of styrene and methyl methacrylate, a copolymer of vinyl chloride and vinyl acetate, etc.

Applicant has discovered that, notwithstanding the indications of the prior art that it should be incompatible with poly(butylene terephthalate) polymers, a certain brominated poly(phenylene oxide) polymer allows one to obtain a flame retarded poly(butylene terephthalate) composition which, under all conditions of use, exhibits substantially less surface migration than does a comparable polymer containing decabromobiphenyl oxide.

SUMMARY OF THE INVENTION

In accordance with this invention, there is provided a flame retarded, poly(butylene terephthalate) composition. This composition is comprised of poly(butylene terephthalate) and from 5 to about 35 percent (by weight of total composition) of a condensation product derived from brominated phenol by the displacement of bromine from said phenol, wherein (a) said phenol is selected from the group consisting of tribromophenol, tetrabromophenol, pentabromophenol, and mixtures thereof; (b) said condensation product has a repeating structural unit of the formula

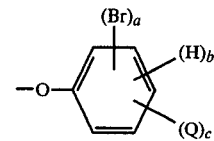

wherein a is an integer of from about 0 to about 4, b is an integer of from about 0 to about 2, c is an integer of from about 1 to about 5, a plus b plus c equal 5, Q is a monovalent bond from a carbon atom in the aromatic nucleus of said repeating structural unit to an oxygen atom bonded to an aromatic nucleus, and the polymeric units containing said repeating structural unit comprise at least 80 percent (by weight) of said product; (c) said condensation product contains from about 17 to about 31 percent (by weight) of elemental carbon, from about 0 to about 1.0 percent (by weight) of elemental hydrogen, from about 3 to about 8 percent (by weight) of elemental oxygen, and at least 60 percent (by weight) of elemental bromine; and (d) said condensation product has a molecular weight of at least 750, and one or more polymeric units containing at least four aromatic nuclei per unit comprise at least 80 percent (by weight) of said product.

PREFERRED EMBODIMENTS

The condensation product described hereinabove which flame retards the poly(butylene terephthalate) composition of this invention has a repeating structural unit of the formula

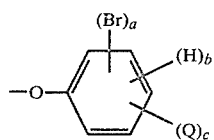

wherein a is an integer of from about 0 to about 4, b is an integer of from about 0 to about 2, c is an integer of from about 1 to about 5, a plus b plus c equal 5, Q is a monovalent bond from a carbon atom in the aromatic nucleus of said repeating structural unit to an oxygen atom bonded to an aromatic nucleus. This monovalent bond may exist any place on the aromatic nuclei in the composition wherein there was a carbon-bromine bond; it is formed by the displacement of bromine. Thus, for example, it may exist in the position para to the oxygen-carbon bond. One repeating structural unit which has this para bond may be represented by the formula

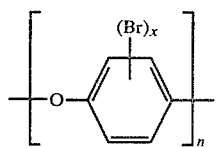

wherein x is 1, 2, 3, or 4 (and preferrably is 2 or 3); this repeating unit forms linear chains. Thus, in other instances where c is 1, the monovalent bond may exist at the ortho position (hereinafter referred to as "II"). The bond may exist at both the ortho and para positions when c is 2 (hereinafter referred to as "III"); and it may exist ortho, ortho, and para to the carbon-oxygen bond when c is 3 (hereinafter referred to as "IV"). The flame retarding condensation product contains at least one of the repeating structural units denoted I, II, III, and IV. At least 80 percent (by weight) of this product is comprised of polymer chains containing one or more of these units.

The flame retarding condensation product is derived from a brominated phenol selected from the group consisting of tribromophenol, tetrabromophenol, pentabromophenol, and mixtures thereof. It is preferred that the brominated phenol be selected from the group consisting of tribromophenol and tetrabromophenol; and it is most preferred that the brominated phenol be tribromophenol.

This condensation product has a molecular weight of at least about 750, and one or more polymeric units containing at least four aromatic nuclei per unit comprise at least about 80 percent (by weight) of the product. The molecular weight of the product is determined in accordance with the vapor phase osmometry method specified by test A.S.T.M. D2503-67.

The flame retarding condensation product contains from about 17 to about 31 percent (by weight) of carbon, from about 0 to about 1.0 percent (by weight) of elemental hydrogen, from about 3 to about 8 percent (by weight) of elemental oxygen, and at least about 60 percent (by weight) of elemental bromine. It is preferred that said condensation product contain from about 62 to about 66 percent (by weight) of elemental bromine.

It is preferred that the flame retarding condensation product used in the composition of this invention, when fused to form test specimens 0.125" thick, have a notched Izod impact strength of less than about 0.5 foot-pounds per inch (A.S.T.M. D256), and an elongation of less than about 2.0 percent and a tensile strength of less than about 200 pounds per square inch (A.S.T.M. D638).

In one of the preferred embodiments, the flame retarding condensation product contains less than about 200 aromatic nuclei and has an intrinsic viscosity (in tetrahydrofuran at 25 degrees centigrade) of less than about 1.8.

The flame retarding condensation product may be prepared by any of several methods well known to those skilled in the art. Generally, the brominated phenol is contacted with an effective amount of activating agent and allowed to condense for a period of up to about 300 degrees centigrade. Suitable activating agents include, without limitation, heat, light, organic and inorganic peroxides such as benzoyl peroxide, hydrogen peroxide, dimethane sulfonyl peroxide, lauroyl peroxide, caprylyl peroxide, succinic peroxide, acetyl peroxide, p-tertiarybutyl benzoyl peroxide, tertiary-butylperoxy isopropyl carbonate peroxide, hydroxyheptyl peroxide, cyclohexane peroxide, 2,5-dimethylhexane-2,5-di(peroxybenzoate) peroxide, tertiary-butyl peracetate peroxide, di-tertiarybutyl diperphthalate peroxide, tertiary butyl perbenzoate peroxide, and the like; azo compounds, such as azobisisobutyronitrile, for example; persulfates, such as ammonium persulfate, potassium persulfate, and sodium persulfate; hypochlorites; ferricyanides; ferric chloride; metal oxides, such as lead oxide, mercury oxide, silver oxide, and the like; halogen, such as iodine, bromine, and chlorine; lead tetracetate; sodium bismuthate; etc. Generally, any of the activators known to promote free radical chain initiation may be used.

Alternatively, one may use a metal salt of the brominated phenol with the activating agents. Suitable salts which may be utilized include, without limitation, the lithium, sodium, potassium, barium, zinc, and tin salts of the brominated phenol. Other phenolates well known to those skilled in the art may also be used.

The brominated phenol (or the metallic salt derived from it) may be contacted with the activating agent in the solid state. Alternatively, one may conduct the polymerization of the brominated phenol (or its salt) in a suitable inert solvent. In general, any of the inert aqueous or organic solvents in which phenol or its salt are known to be soluble may be used to prepare the flame retarding condensation product. Suitable solvents include, without limitation, water, dimethylsulfoxide, acetone, hexane, methanol, ethanol, propanol, butanol, benzene, toluene, tetrahydrofuran, etc. Aqueous salt solutions wherein the salt is selected from the group consisting of barium chloride, calcium chloride, magnesium chloride, strontium chloride, potassium chloride, lithium chloride, sodium chloride, and the like may also be utilized. Mixtures of organic solvents and water may be used; thus aqueous acetone solutions, benzene and water, aqueous alkaline solution and organic compounds insoluble in water (such as octyl alcohol, toluene, and heptane), carbon tetrachloride and water, amyl alcohol and water, and the like are suitable.

One of many methods which may be used to prepare the condensation product involves dissolving a metal hydroxide in water and, to the solution thus formed, adding activating agent and the brominated phenol; thereafter, the reaction mixture is maintained at a specified temperature.

In this method, an emulsifying agent may be used to suspend the condensation product in aqueous media; when so used, from about 0.1 to about 5.0 percent of it (by weight of water in the hydroxide solution) should be present in the reaction mixture. The emulsifying agent may be added prior to or simultaneously with the addition of the brominated phenol to the reaction mixture.

In this method, an alkali or alkaline earth metal hydroxide may be used. It is preferred to use a metal hydroxide selected from the group consisting of sodium hydroxide, potassium hydroxide, and lithium hydroxide; sodium hydroxide is the most preferred. From about 0.5 to about 5.0 moles of the hydroxide per liter of water is utilized. It is preferred to use from about 1 to about 3 moles of hydroxide per liter of water; it is most preferred to use about 2 moles of the hydroxide per liter of water.

The brominated phenol described hereinabove is added to the reaction mixture at a concentration of from about 0.5 to about 5 moles per liter of water to make up the hydroxide solution in this method. It is preferred to use from about 1 to about 3 moles of phenol per liter of water. It is most preferred that the concentration be about 2 moles of phenol per liter of water.

In this method, although it is not essential, organic solvent may be added to the reaction mixture; any of the organic solvents listed hereinabove may be utilized. When organic solvent is used, it is preferred that from 1 to about 20 percent of it (by volume of water used to make up the hydroxide solution) be utilized. It is more preferred to use from about 3 to about 10 percent of organic solvent in this process; and it is most preferred to use from about 4 to about 8 percent of organic solvent. Some of the preferred organic solvents include toluene, benzene, chloroform, chlorinated benzenes, and the like.

Activating agent is contacted with the reaction mixture after all of the other components are present in this process. When the activating agent is solid, liquid, or gaseous, at least about $1 \times 10^{-5}$ moles of it (based upon liters of water used to make up the hydroxide solution) is used; it is preferred to use from about 0.01 to about 0.1 moles of these activating agents.

After the activating agent has been contacted with the reaction mixture, the reaction mixture is maintained at a temperature of from about 20 to about 180 degrees centigrade for from about 5 to about 300 minutes in this process. It is preferred to maintain the reaction mixture at a temperature of from about 20 to about 100 degrees centigrade for from about 15 to about 120 minutes. It is most preferred to maintain the reaction mixture at a temperature of from about 45 to about 65 degrees centigrade for from about 20 to about 40 minutes.

In this process, it is preferred that the reaction be run at a pressure of from about 1.0 to about 20 atmospheres. It is more preferred to use a pressure of about 1.0 atmosphere during the reaction.

The flame retarded composition of this invention contains from about 5 to about 35 percent (by weight of total composition) of the flame retarding condensation product referred to hereinabove. It is preferred that it contain from about 9 to about 22 percent (by weight of total composition) of said flame retarding condensation product.

The method of adding the flame retardant additive to the poly(butylene terephthalate) is not critical; any means well known to those skilled in the art may be utilized. Similarly, other additives may be incorporated into the poly(butylene terephthalate) composition of this invention by means well known to those skilled in the art. It is preferred that each ingredient be added as part of a blend premix and the premix be mixed, e.g., by passage through an extruder or by fluxing on a mill at a temperature dependent on the needs of the particular compositions. The mixed composition can be cooled and cut up into molding granules and molded or extruded or formed into any desired shape.

The flame retarded composition of this invention may also contain enhancing agents which, when used with said condensation product, promote a cooperative effect there between and thus enchance the flame retardancy of the resultant composition as compared to the flame retardancy of compositions containing either component alone. Those skilled in the art are familiar with these enhancing agents.

Some of the enhancing agents well known to those skilled in the art include the oxides and halides of the metals of groups IVA and VA of the Periodic Table such as the oxides and halides of antimony, bismuth, arsenic, tin, lead, and germaniun; antimony oxychloride, antimony chloride, antimony oxide, stannic oxide, stannic chloride, arsenous oxide, arsenous chloride, and the like are enchancing agents well known to the art. Other enhancing agents well known to those skilled in the art are the organic and inorganic compounds of phosphorous, nitrogen, boron, and sulfur; thus, e.g., triphenyl phosphate, ammonium phosphate, zinc borate, thiourea, urea, stannic sulfide, and the like are suitable enchancing agents. The oxides and halides of titanium vanadium, chromium, magnesium are also used as enhancing agents as are the hydrates of these compounds thus, e.g., titanium dioxide, titanium chloride, vanadium pentoxide, chromic bromide, manganous oxide, molybdenum trioxide, ammonium molybdate, stannous oxide hydrate, lead hydrate, and combinations thereof may be used. Many antimony compounds, both organic and inorganic, are useful as enhancing agents; antimony sulfide, sodium antimonite, potassium antimonite, antimony butyrate, antimony valerate, antimony caproate, antimony heptylate, antimony caprylate, antimony pelargonate, antimony caprate, antimony cinnamate, antimony anisate, tris(n-octyl) antimonite, tris(2-ethylhexyl) antimonite, tribenzyl antimonite, trimethylolpropane antimonite, pentaerythritol antimonite, glycerol antimonite, and compounds which on decomposition (as by ignition) yield antimony oxide are well known to the art as enhancing agents.

The preferred enhancing agents are the oxides of antimony, arsenic, and bismuth. The more preferred enhancing agents are the oxides of antimony. The most preferred enhancing agent is antimony trioxide.

When an enhancing agent is incorporated into the flame retarded composition of this invention, from 1 to about 20 percent of it (by weight of the combined poly-butylene terephthalate, flame retardant, an enhancing agent) may be used. It is preferred to utilize from about 3 to about 10 percent (by weight) of enhancing agent.

It is also within the scope of the present invention to employ other materials in the compositions of the invention where one so desires to achieve a particular end result. Such materials include, without limitation, adhesion promotors; antioxidants; antistatic agents; antimicrobial agents colorants; other flame retardants (in addition to the flame retarding condensation product described herein); heat stabilizers; light stabilizers; fillers; reinforcing agents; and other materials well known to those skilled in the art which have been or could be used in poly(butylene terephthalate) compositions. These materials may be employed in any amounts which will not substantially adversely affect the properties of the poly(butylene terephthalate) of this invention. Thus, the amount used can be zero (0) percent, based on the total weight of the composition, up to that percent at which the composition can still be classified as a plastic. In general, such amount will be from about 0% to about 80%.

Glass reinforced poly(butylene terephthalate) comprised of from about 6 to about 60 percent (by weight) of fiberglass and the poly(butylene terephthalate) composition of this invention is within the scope of this invention. The glass fibers used to make this composition may be treated with coupling agents well known to those skilled in the art so that the polymer will bond strongly to the surface of the glass. Additionally, or alternatively, other agents ( such as, e.g., asbestos) may be utilized in the composition of this invention.

The terephthalate component of the composition of this invention consists of linear polymer containing at least about 85 percent (by weight) of poly(butylene terephthalate). It may be prepared by reacting terephthalic acid or its dialkyl ester and polymethylene glycol of the formula $HO(CH_2)_nOH$ wherein n is from 2 to 8. At least 85 percent of said polymer is prepared from a glycol wherein n is 4(1,4-butanediol), and some or all of the remaining 15 percent may be prepared from ethylene glycol, trimethylene glycol, 1,4-butanediol, and the like. The polymethylene glycol used to prepare some or all of said remaining 15 percent may be replaced entirely or in part with other glycols such as 1,4 -cyclohexanedimethanol; 1,4-bis(2-hydroxyethyloxy) benzene, and the like. It is preferred that no more than about 10 percent of the polymer will be prepared from a glycol which is not a polymethylene glycol.

Other dicarboxylic acids and their esters may be used to prepare the terephthalate used in this invention. Thus, e.g., from about 1 to about 10 weight percent (based on the weight of terephthalic acid or the dialkyl ester thereof used to make the polymer) of a dicarboxylic acid selected from the group consisting of phthalic acid, isophthalic acid, and HOOC-R-COOR (wherein R is alkylene of from about 2 to about 15 carbon atoms) may be used. When said dicarboxylic acid is used in the preparation of the terephthalate, it is preferred to used from about 3 to about 8 weight percent thereof. Some of the dicarboxylic acids which may be used to prepare the terephthalate of this invention include, e.g., succinic acid, glutaric acid, adipic acid, pimelic acid, suberic acid, azelaic acid, sebacic acid, and the like.

Subject to the limitation described above (viz., at least 85 weight percent of the terephthalate component is poly(butylene terephthalate), the composition of this invention may contain other materials than the ones hereinbefore described such as, e.g., dye site additives, delustrants, antistatic agents, optical brighteners, mold release agents, nucleating agents, etc.

Under all conditions of use, the flame retarded poly (butylene terephthalate) composition of this invention exhibits substantially less surface migration than does a comparable poly(butylene terephthalate) compostion containing decarbomobiphenyl oxide.

The following examples are provided for the purpose of further illustration only and are not intended to be limitations on the invention disclosed. Unless otherwise specified, all parts are by weight, all weights are in grams, all temperatures are in degrees centigrade, and all volumes are in milliliters.

PREPARATION OF THE FLAME RETARDING CONDENSATION PRODUCTS

EXAMPLE I

Two hundred milliliters of chloroform were added to a one liter, three-necked, round-bottomed flask fitted with mechanical stirring, addition funnel, reflux condenser, and nitrogen flush. Sixteen and one-half grams of 2,4,6-tribromophenol were added to the chloroform. Thereafter, 2.8 grams of potassium hydroxide were dissolved in 100 milliliters of water, and this solution was then added to the reaction mixture. An aqueous solution of potassium ferricyanide was prepared; 1.6 grams of the potassium ferricyanide were dissolved in 100 milliliters of water. This solution was added over a period of one hour to the reaction mixture. Thereafter, the reaction mixture was maintained at ambient temperature and stirred for 4.5 hours. Then the reaction mixture was poured into a separatory funnel. The bottom chloroform phase was dropped directly into vigorously stirred methanol. The white precipitate which formed was filtered and dried. This product softened at a temperature of from about 220 to about 240 degrees centigrade. It had an intrinsic viscosity (in chloroform, at 25 degrees centigrade) of 0.050 deciliters per gram.

EXAMPLE II

To a one liter, three-necked, round-bottomed flask fitted with mechanical stirring, reflux condenser, and nitrogen flush were added 100 milliliters of 1,2,4-trichlorobenzene. Thereafter, 58.7 grams of pentabromophenol were added with stirring; and then 2.9 grams of benzoyl peroxide were added to the reaction mixture. A solution of potassium hydroxide (6.8 grams of KOH in 100 milliliters of water) was prepared; and this solution was quickly added to the reaction mixture. Two milliliters of dimethyl sulfoxide and four milliliters of dimethyl formamide were then added to the reaction mixture, causing a mild exotherm. Stirring was continued at ambient temperature for five hours. The reaction mixture was then poured into a separatory funnel. The 1,2,4-trichlorobenzene layer (bottom) was then dropped directly into vigorously stirred acetone. The precipitated product was dissolved in 100 milliliters of tetrahydrofuran and reprecipitated in 450 milliliters of acetone. The product had a softening point of about 290 degrees centigrade.

EXAMPLE III-VI

These experiments were conducted in substantial accordance with the procedure described in Example I, but different catalysts and/or different brominated phenols (or mixtures thereof) were used. The results of these experiments are summarized in Table I, below. In Examples III and IV, 2,4,6-tribromophenol was utilized as the reactant. Examples V and VI utilized pentbromophenol.

TABLE I

| EXAMPLE NUMBER | CATALYST (10 MOLE %) | POLYMER YIELD (%) | SOFTENING POINT (°C.) | INTRINSIC VISCOSITY (25° C., chloroform, decliters/gram) |
|---|---|---|---|---|
| III | K$_3$Fe(CN)$_6$ | 80 | 240-260 | 0.050 |
| IV | BENZOYL PEROXIDE | 100 | 225-250 | 0.050 |
| V | K$_3$Fe(CN)$_6$ | 10 | 290 | 0.0 |
| VI | BENZOYL PEROXIDE | 86 | 290 | 0.0 |

EXAMPLES VII and VIII

The procedure described in Example I was substantially followed with the exception that equimolar amounts of 2,4,6-tribromophenol and pentabromophenol were utilized as the reactant. In Example VII, potassium ferricyanide was utilized as the catalyst (10 mole %); a 12 percent yield of a product with a softening point of from about 210 to about 220 degrees centigrade was obtained. In Example VIII, benzoyl peroxide was utilized as a catalyst (10 mole %); a 98 percent yield of a product with a softening point of 250 degrees centigrade and an intrinsic viscosity (at 25 degrees centigrade in chloroform) of 0.032 decilters per gram was obtained.

EXAMPLE IX

Two thousand milliliters of water, 164 grams of sodium hydroxide, 10.7 grams of "Emulsifier 334" (an aryl polyether emulsifier sold by the Milliken Chemical Corporation), 0.7 grams of docecyl sodium sulfate, and 1324 grams of 2,4,6-tribromophenol were charged to a five-liter flask fitted with mechanical stirring, a thermometer, and a reflux condenser. The reaction mixture was first heated to 100 degrees centigrade and maintained at that temperature for one minute; then it was cooled to a temperature of 33 degrees centigrade. To this mixture was charged 133 milliliters of toluene and 20 grams of benzoyl peroxide. An exothermic reaction occurred, and the reaction temperature was then maintained at 55 degrees centigrade for 0.5 hours. Thereafter, 25 grams of sodium hydroxide were added to the reaction mixture. The reaction mixture was then filtered, the filter cake was washed with 15 liters of water, and the filter cake was dried to give 932 grams of product.

FLAME RETARDED POLYMERIC COMPOSITIONS

EXAMPLE X

Four hundred and twenty grams of glass-filled poly(butylene terephthalate) comprised of 30 percent (by weight) of glass fiber, 60 grams of the flame retardant product of Example IX, and 20 grams of antimony trioxide were dry blended and compounded by adding these ingredients to a Brabender mixer ("Prep Center", Model R6, C. W. Brabender Instruments Inc., Hackensack, N.J.); the compounding was conducted for about 2 minutes at a temperature of 240 degrees centigrade. The mixture was then cooled, granulated, and fed into a Newbury injection molding machine (Model HI-30RS manufactured by Newbury Instruments Inc., Newbury, Ohio). Test specimens were molded using a stock temperature of 470 degrees Fahrenheit, and injection pressure of 2000 pounds per square inch, and a cycle time of 55 seconds.

The specimens contained 12 percent (by weight) of the product of Example IX and 4 percent (by weight) of antimony trioxide.

The test specimens were tested for flammability in accordance with Underwriter's Laboratory Subject No. 94 test (U.L. Tests for Flammability of Plastic Materials, U.L. 94, Feb. 1, 1974). In this test, the test specimen was supported from the upper end, with the longest dimension vertical, by a clamp on a ring stand so that the lower end of the specimen was ⅜" above the top of the burner tube. The burner was then placed remote from the sample, ignited, and adjusted to produce a blue flame ¾" in height. The test flame was placed centrally under the lower end of the test specimen and allowed to remain for 10 seconds. The test flame was then withdrawn, and the duration of flaming or glowing combustion of the specimen was noted. If flaming or glowing combustion of the specimen ceased within 30 seconds after removal of the test flame, the test flame was again placed under the specimen for 10 seconds immediately after flaming or glowing combustion of the specimen stopped. The test flame was again withdrawn, and the duration of flaming or glowing combustion of the specimen was noted. If the specimen dripped flaming particles or droplets while burning in this test, these drippings were allowed to fall onto a horizontal layer of cotton fibers (untreated surgical cotton) placed one foot below the test specimen. Significantly flaming particles were considered to be those capable of igniting the cotton fibers. The duration of flaming or glowing combustion of vertical specimens after application of the test flame (average of 5 specimens with 10 flame applications) should not exceed 25 seconds (maximum not more than 30 seconds) and the portion of the specimen outside the clamp should not be completely burned in the test.

Materials which complied with the above requirements and did not drip any flaming particles or droplets during the buring test were classified as "V-1". Materials which complied with the above requirements but dripped flaming particles or droplets which burned briefly during the test were classified as "V-2". A "V-0" rating was given to materials wherein the duration of flaming or glowing combustion averaged less than 5 seconds under the conditions specified above.

The test specimens were also tested for migration by being subjected to a temperature of 100 degrees centigrade for 100 hours and then being visually observed to determine whether any flame retardant had migrated to the surface.

The poly(butylene terephthalate) composition of this Example had a U.L. 94⅛" rating of V-0, and U.L. 94 1/16" rating of V-0, and did not exhibit exudation of the flame retardant to the surface after being subjected to a temperature of 100 degrees centigrade for 100 hours.

A comparable poly(butylene terephthalate) composition comprised of 12 weight percent of decarbromobiphenyl oxide and 4 weight percent of antimony trioxide exhibited heavy exudation after being subjected to a temperature of 100 degrees for 100 hours.

EXAMPLE XI

The procedure of Example X was substantially followed with the exception that an unfilled poly(butylene terephthalate) was utilized and compounded with 3.3 percent (by total weight) of antimony trioxide and 10 percent (by total weight) of either flame retardant product made in substantial accordance with the procedure of Example IX or decabromobiphenyl oxide. Test specimens were prepared in accordance with the procedure of Example X and were subjected to accelerated aging at a temperature of 100 degrees centigrade.

The specimens containing decabromobiphenyl oxide exhibited moderate surface exudation after 18 hours exposure at 100 degrees centigrade and heavy surface exudation after 100 hours exposure at 100 degrees centigrade. The specimens containing the flame retardant prepared in accordance with the procedure of Example IX exhibited no surface exudation after being exposed to a temperature of 100 degrees centigrade for either 18 hours or 100 hours.

EXAMPLE XII

The procedure of Example X was substantially followed with the exception that an unfilled poly(butylene terephthalate) was utilized and compounded with antimony trioxide and either the flame retardant product of Example IX or decabromobiphenyl oxide test specimens comprised of 12 percent (by weight) of flame retardant and 4 percent (by weight) of antimony trioxide were prepared.

After being subjected to accelerated aging for 100 hours at 100 degrees centigrade, test specimens containing the flame retardant of Example IX were visually examined; they did not exhibit any migration to the surface of the flame retardant. However, the specimens containing the decabromobiphenyl oxide flame retardant exhibited heavy surface migration.

The test specimens were also subjected to accelerated aging for 72 hours at 150 degrees centigrade. The test specimens containing the flame retardant of Example IX exhibited very slight surface migration after being subjected to these accelerated aging conditions. The test specimens containing the decabromophenyl oxide flame retardant again exhibited heavy surface migration under these conditions.

As previously indicated, it is most preferred that the flame retardant condensation product of this invention is derived from tribromophenol. It has been found that the condensation product of tribromophenol in accordance with the present invention has a novel molecular structure exhibiting desirable properties over closely related compositions.

More specifically, the preferred flame retarding condensation product of this invention is a branched polymer having a hydroxyl number of from 2.8 to about 30 and the structural formula

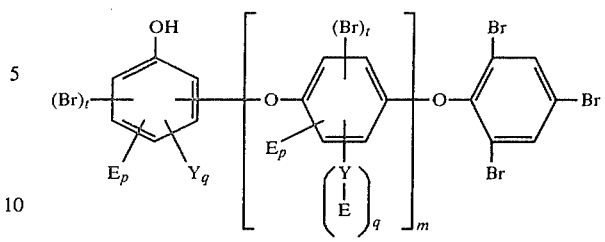

wherein each repeating unit set out within the brackets of the structural formula is attached in an ortho or para configuration to its adjacent phenyl and phenoxy moiety; and wherein E is an end group of the formula

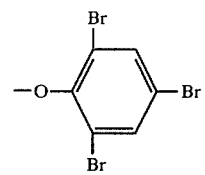

Y is a side chain of the same structure and configuration as said repeating unit; the substituents Br, E and Y on each phenyl ring are attached only to the ortho or para positions relative the hydroxyl group in the structural formula and the oxygen atom in the repeating unit; each t, p and q are independently the integer 0 or 1, provided that the sum of t plus p plus q equals 2, and provided that from about 10 to about 80 percent of the repeating units have the side chain and end unit —Y—E attached thereto; and m is an integer such that the total molecular weight of the polymer ranges from about 2,000 to about 20,000.

The novelty and unexpected desired properties of the polymer described above are attributed to both the chemical as well as its structural configuration. First the polymer, because it is a condensation product of a phenol, necessarily has a residual hydroxyl group. This group can be titrated and accordingly the polymer has a hydroxyl number dependent on its molecular weight. As stated, this hydroxyl number typically ranges from 2.8 to about 30 mg per gram of sample.

It has also been found that the condensation of tribromphenol as described herein results in a 1-2 and 1-4 substitution of bromine relative the phenolic moiety. Therefore, each repeating phenoxy group in the polymer is attached to an ortho or para position relative the phenolic group on the adjacent ring. Thus, any two repeating units have the following structural configuration

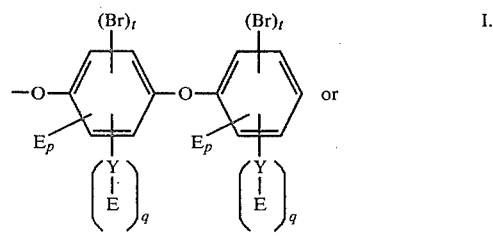

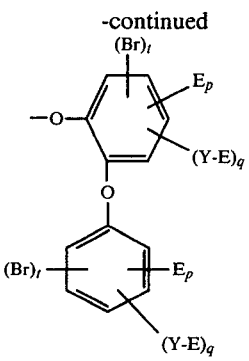

wherein Y, E, t, p and q are as heretofore described. Similarly, the side chains represented by Y and the end groups represented by E are attached to the ortho or para position of the respective phenoxy ring.

An important aspect of the preferred fire retardant condensation product is its branching i.e. the existence of side groups on otherwise linear polymer backbone. These side groups can be one or more repeating units as in the backbone of the polymer terminated by an end group or simply an end group by itself. The degree of branching in the preferred product can vary such that at least one in ten of the phenoxy units are substituted by a side chain or end group and as many as eight in 10 are so substituted. It is believed that this degree of branching significantly contributes to the non-blooming properties of polyester compositions containing the preferred product.

The preferred condensation product of the present invention has a number average molecular weight that ranges from about 2000 to about 20,000, and most preferably from about 2000 to about 12,000 as determined by vapor phase osmometry (VPO).

The preferred condensation product of tribromophenol of the present invention can be prepared by the general procedure heretofore described. A further more specific exemplary preparation is set forth in the following example.

EXAMPLE XIII

Sodium tribromopenate (387 grams) dissolved in water to obtain a 37 percent by weight solution is charged into a reaction vessel equipped with stirring and heating means. Hydrochloric acid (1.9 grams; 31.5% concentration) is added and the resulting mixture is warmed to 40° C. with stirring. Potassium persulfate (2.3 grams) is added to the reaction vessel and stirring is continued for a period of about 30 minutes. A reaction temperature of 55 to 60° C. is maintained during this period. After this time the pH of the reaction mixture is adjusted to about 13 by the addition of 50% aqueous caustic soda and thereafter hydrazine (1 gram; 64% conc.) is added with stirring. Stirring is continued for a period of 15 minutes and the reaction mixture is thereafter heated to a temperature of 95 to 100° C. with further stirring for a period of 4 hours. After this time the mixture is cooled to room temperature and the desired product is recovered by filtration and dried.

We claim:

1. A flame retarded poly(butylene terphthalate) composition comprised of poly(butylene terphthalate) and from about 5 to about 35 percent by weight of a branched polymer having a hydroxyl number of from 2.8 to about 30 of the structural formula

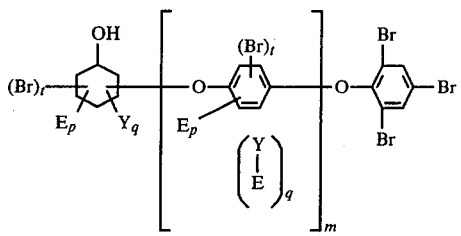

wherein each repeating unit set out within the brackets of the structural formula is attached in an ortho or para configuration to its adjacent phenyl and phenoxy moiety; and wherein E is an end group of the formula

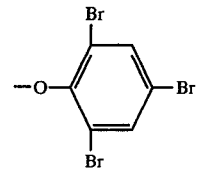

Y is a side chain of the same structure and configuration as said repeating unit; the substituents Br, E and Y on each phenyl ring are attached only to the ortho or para positions relative the hydroxyl group in the structural formula and the oxygen atom in the repeating unit; each t, p and q are independently the integer 0 or 1, provided that the sum of t plus p plus q equals 2, and provided that from about 10 to about 80 percent of the repeating units have the side chain and end unit —Y—E attached thereto; and m is an integer such that the total molecular weight of the polymer ranges from 2000 to 20,000.

2. The flame retarded composition of claim 1, wherein said composition contains from about 9 to about 22 percent by weight of the branched polymer.

3. The flame retarded composition of claim 1, wherein said composition contains from about 1 to about 20 percent by weight of enhancing agent selected from the group consisting of the oxides of antimony, arsenic and bismuth.

4. The flame retarded composition of claim 3, wherein the enhancing agent is antimony trioxide.

5. The flame retarded composition of claim 1 to which has been added from about 6 to about 60 percent by weight of the total composition glass fiber.

* * * * *

UNITED STATES PATENT AND TRADEMARK OFFICE
CERTIFICATE OF CORRECTION

PATENT NO. : 4,242,473
DATED : December 30, 1980
INVENTOR(S) : Richard C. Nametz and Robert J. Nulph It is certified that error appears in the above-identified patent and that said Letters Patent are hereby corrected as shown below:

In Claim 1 the first structural formula should read:

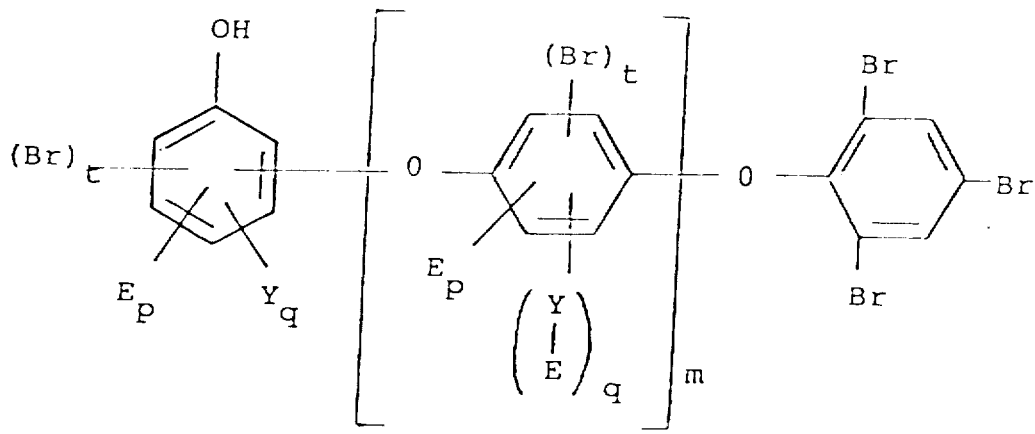

Signed and Sealed this

Twenty-fifth Day of August 1981

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,242,473

DATED : December 30, 1980

INVENTOR(S) : Richard C. Nametz et al.

It is certified that error appears in the above-identified patent and that said Letters Patent is hereby corrected as shown below:

Column 12, lines 1 and 2, the structural formula, and
In Claim 1 the first structural formula appearing as

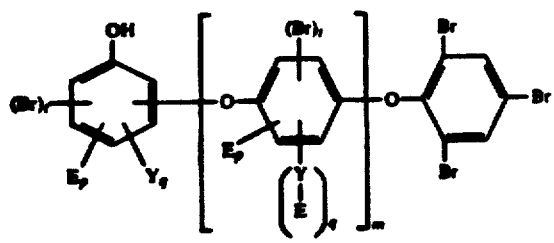

should read:

UNITED STATES PATENT AND TRADEMARK OFFICE
CERTIFICATE OF CORRECTION

PATENT NO. : 4,242,473

DATED : December 30, 1980

INVENTOR(S) : Richard C. Nametz et al.

It is certified that error appears in the above-identified patent and that said Letters Patent is hereby corrected as shown below:

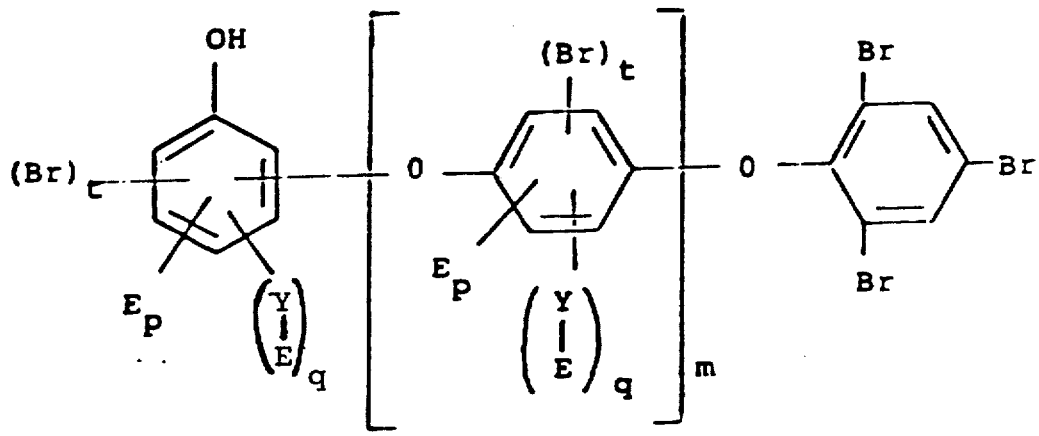

Signed and Sealed this

Fourteenth Day of December 1982

[SEAL]

Attest:

Attesting Officer

GERALD J. MOSSINGHOFF

Commissioner of Patents and Trademarks